UNITED STATES PATENT OFFICE.

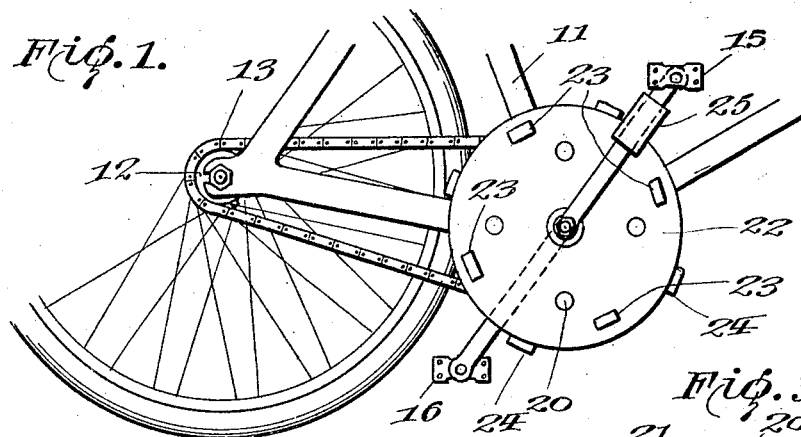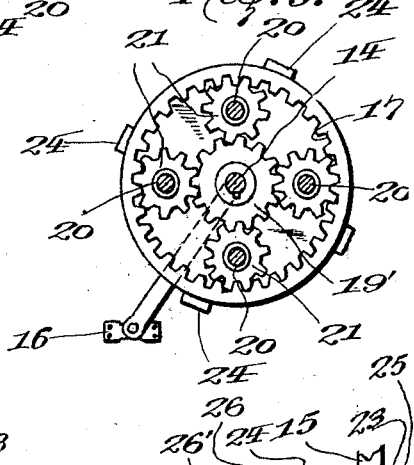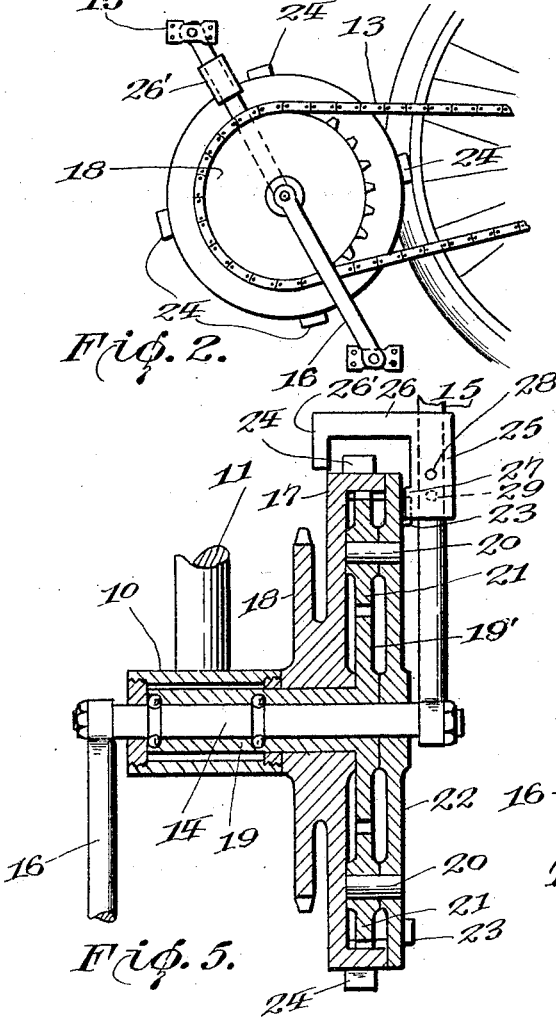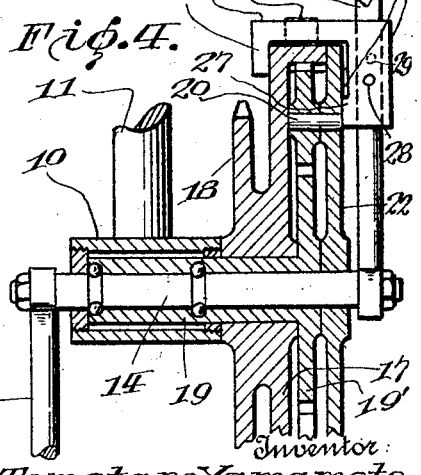

TOMETARO YAMAMOTO, OF HILO, TERRITORY OF HAWAII.

BICYCLE GEARING.

1,411,548.  Specification of Letters Patent.  Patented Apr. 4, 1922.

Application filed July 18, 1921. Serial No. 485,581.

*To all whom it may concern:*

Be it known that I, TOMETARO YAMAMOTO, a citizen of Japan, residing at Hilo, in the county of Hawaii, Territory of Hawaii, have invented certain new and useful Improvements in Bicycle Gearing; and I do hereby declare the following to be a full, clear, and exact description of the invention, such as will enable others skilled in the art to which it appertains to make and use the same.

This invention relates to new and useful improvements in gearing and particularly to gearing for bicycles.

One object of the invention is to provide a gearing for a bicycle which can be easily and quickly changed.

Another object is to provide a change speed gearing for a bicycle which is readily capable of use with or without the usual coaster brake.

The invention contemplates the use of a drive sprocket element for the crank portion of a bicycle which includes a system of planetary gears arranged to be coupled together to turn as a unit at times, and to rotate in a planetary motion to effect the changing of the speed of the bicycle pedals to render propulsion of the bicycle easy.

Other objects and advantages will be apparent from the following description when taken in connection with the acompanying drawing.

In the drawing:

Figure 1 is a side elevation of a portion of a bicycle showing the application of my improved gearing.

Figure 2 is a side elevation looking from the opposite side of the bicycle, to show the sprocket wheel.

Figure 3 is a side elevation of the gearing, viewed from the same side as that of Figure 1, but with the side disk removed, and the planet gear shafts in section.

Figure 4 is an enlarged vertical central sectional view through the gearing, showing the locking member in lowered position and engaged with the internal gear.

Figure 5 is a similar sectional view but with the locking member in elevated position and engaged with the outer disk.

Referring particularly to the accompanying drawing, 10 represents the crank hanger of the bicycle frame 11, and 12 the rear sprocket wheel of the bicycle, while 13 represents the drive chain.

Through the crank hanger 10 is disposed the crank shaft 14, having on its ends the pedals 15 and 16. Rotatable on the sleeve 19, which is rigidly secured within the crank hanger, is the internal gear 17, and on the inner side face of this gear is formed the sprocket wheel 18, around which the drive chain 13 is engaged. On the opposite side of the internal gear 17, and rigidly carried by the outer end of the said sleeve 19, is the central stationary gear 19', which is disposed centrally within the internal gear 17. It will be noted that the crank shaft 14 rotates within the sleeve 19. A rotatable outer disk plate 22 is engaged on the shaft 14, outwardly of the internal gear, and in this disk, in a circular line, are secured the stub shafts 20, each of which carries a small planet gear 21. These planet gears 21 mesh with the teeth of the internal gear 17 and with those of the central gear 19'.

Formed on the outer face of the disk 22, and at regularly spaced intervals, in a circular series, are the outwardly projecting lugs 23. On the peripheral face of the internal gear 17 there are formed a series of radially extending lugs 24. Slidable on the pedal arm 15 is a sleeve 25, and on the outer end of the sleeve there is formed a laterally and inwardly extending arm 26, which is adapted to lie in the path of the lugs 24, and engage with one of the lugs to rotate the gear 17 with the pedals. The outer end of the arm 26 has an angularly turned portion 26' which engages with the exposed side face of the gear 17 to prevent lateral movement of the arm. Also formed on the sleeve, inwardly of the arm 26, is a lug 27 which, when the sleeve is moved inwardly along the crank arm, toward the shaft 14, will lie in the path of the lugs 23, so that when the shaft and its cranks are turned, the disk 22 will be turned. It will be noted that when the arm 26 engages with a lug 24, the lug 27 is out of the path of the lugs 23, and when the lug 27 is in engagement with one of the lugs 23, the arm 26 is out of the path of the lugs 24. In the first instance, that is with the arm 26 engaged with a lug 24, the internal gear 17 will be rotated with the cranks so that its teeth will cause the rotation of the planet gears 21, and the planetary movement of said gears around the stationary gear 19', with the result that the sprocket 18 will drive direct to the rear sprocket 12, after the manner of the ordinary chain and sprocket gearing of bicycles. When, however, the lug 27 engages with a lug 23, the disk 22 will be rotated at the same speed as the pedals, while the planet gears 21 will be moved or rolled around on the central gear 19', the outer portions of the planet gears causing the internal gear to rotate at a speed lower than that of the disk 22. In this position of the parts, riding up a steep incline is rendered easy, as the pedals will rotate at a greater speed than in the first instance. It will thus be seen that either the gear 17, or the disk 22 is rotated independently of the other, while the motion is transmitted from one to the other in both cases.

To maintain the sleeve 25 in either of its adjusted positions, there is provided a pin 28, which is arranged to be passed through the sleeve 25 and through either one or the other of the openings 29, formed in the pedal arm 15. Thus, when the gear is changed, the parts are locked in such position until a change is desired.

What is claimed is:

1. In a changeable speed gearing, an internal gear having a sprocket formed on one side thereof and radial lugs on its periphery, a shaft having crank arms on its ends, a central stationary gear on the shaft within the internal gear, a rotatable disk on the shaft and having laterally projecting lugs on its outer side face, and a slidable member on one of the crank arms having means for interchangeable engagement with the lugs of the internal gear and the lugs of the disk.

2. In a changeable speed gear, an internal gear having a sprocket formed on one side and radial lugs on its periphery, a central stationary gear having an integral sleeve in which the shaft is rotatable and on which the internal gear rotates, a rotatable disk on the shaft at the other side of the internal gear, and having lugs on its outer face, a circular series of planet gears carried by and movable with the disk and meshing with the internal gear and with the stationary gear, crank arms on the ends of the shaft, a sleeve slidable on one of the crank arms and having a projection for engagement with one of the radial lugs of the internal gear at times, and a lug for engagement with one of the lateral lugs of the disk at times.

In testimony whereof, I affix my signature, in the presence of witnesses.

TOMETARO YAMAMOTO.

Witnesses:
HIROSUKE HAGIHARE,
KOSUKE TAKEI,
WILLIAM H. BEERS.